Oct. 10, 1950     G. H. DALSEMER     2,524,962
METHOD AND APPARATUS FOR SCORING AND CUTTING CARDBOARD
Filed Jan. 19, 1946     2 Sheets-Sheet 1

INVENTOR
Gordon H. Dalsemer
BY
Norman M. Holland
ATTORNEY

Oct. 10, 1950        G. H. DALSEMER        2,524,962
METHOD AND APPARATUS FOR SCORING AND CUTTING CARDBOARD
Filed Jan. 19, 1946        2 Sheets-Sheet 2
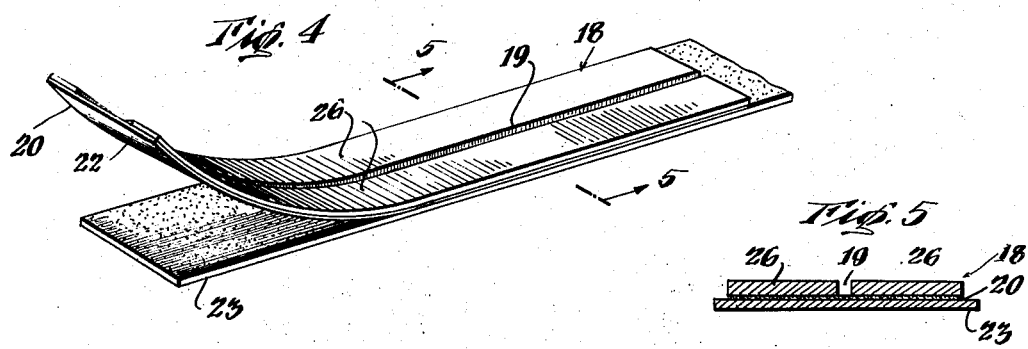
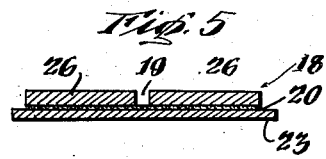
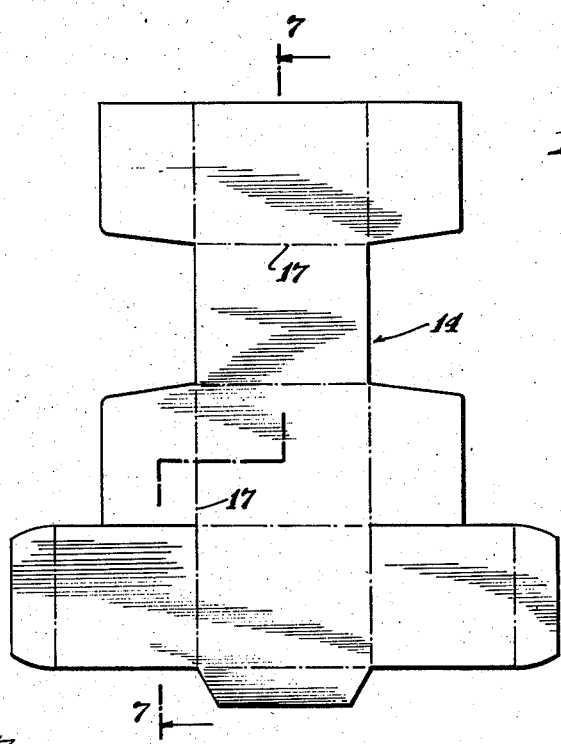
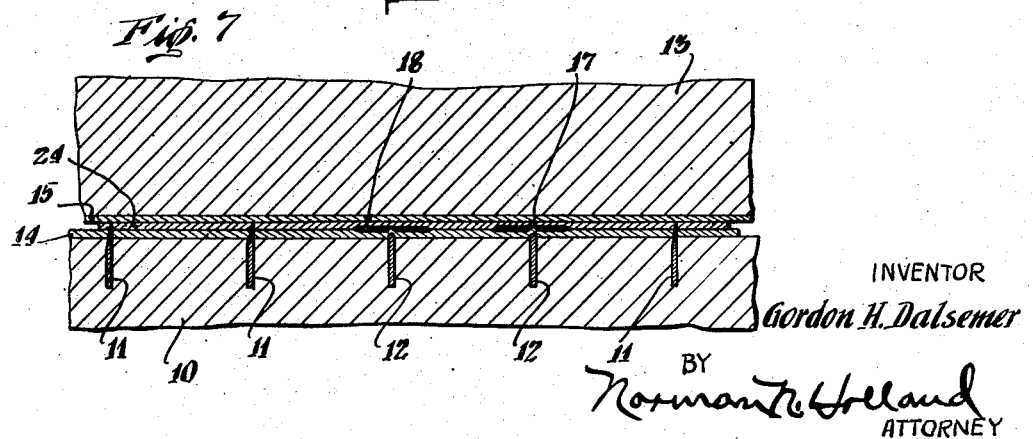
INVENTOR
Gordon H. Dalsemer
BY
Norman R. Holland
ATTORNEY

Patented Oct. 10, 1950

2,524,962

UNITED STATES PATENT OFFICE 2,524,962

METHOD AND APPARATUS FOR SCORING AND CUTTING CARDBOARD

Gordon H. Dalsemer, Baltimore, Md.

Application January 19, 1946, Serial No. 642,350

15 Claims. (Cl. 93—58)

This invention relates to the cutting and scoring of material such as cardboard and paper and book covers, and is herein illustrated in some detail as embodied in a device and process for scoring cardboard preparatory to folding the cardboard in making a cardboard box or carton.

It has hitherto been customary to score cardboard by running it between a hard metal male die and a hand cut female die, cut to cooperate with the male die. In setting up the usual flat-bed-cylinder machine to do a definite form of scoring, a large piece of hard, solid, manila board, called a "counter sheet" has been pasted to the surface of a metal jacket which is bolted to the periphery of the cylinder. The metal jacket serves as a removable surface for the cylinder and as a carrier for the counter sheet adhered to it. The counter sheet is cut away normally to form channels which serve as the female die for creasing. To enable the cutting to be done accurately by workmen it has been customary to mark guide lines for cutting on the surface of the counter sheet by operating the machine with a piece of carbon paper between the surface of the counter sheet on the cylinder and the scoring die. Thus an impression of the die is made on the surface of the counter sheet as a guide in cutting away the counter sheet to form the female die. The creasing die portions form a heavy line and the cutting die portions form thin lines or cut through the carbon paper. The workmen cut channels through the counter sheet along the heavy lines to form the female creasing channels and also cut away the counter sheet entirely to expose the steel surface where the fine lines have been made by the cutting dies. Generally one end of a cutting die abuts the end of a creasing die. If the creasing female channel is off center at that point, the crease in the cardboard box blank does not register with the cut portion and causes difficulty in folding, particularly in machine folding. The scores should be of uniform width and exactly centered over the scoring rule. Scores or creases that are too wide cause the boxes to fold crookedly when passing through a gluing machine. Scores which are too narrow or off center cause the box to crack when folded. Thus the cutting of the counter sheet to form the female die requires highly skilled workmen. The work has to be done on the curved surface of the cylinder which adds to the difficulty. In addition the guide lines are cut away in the channelling which further complicates the work. Cutting away the counter sheet from unwanted spots (where knives must hit the metal jacket) often takes nearly as long as cutting the score channels.

According to the present invention the foregoing and other difficulties and objections are overcome and a material or device is provided which enables suitable female creasing dies or channels to be built on the steel skin by relatively unskilled labor, and to be accurately positioned and to be of proper width without laboriously cutting them out or cutting out other parts of the creasing makeready. In the preferred embodiment the female die is formed in a separate strip of channelled flexible material, which may be regarded as a tape, and suitable lengths of the tape are adapted to be cut off and applied to the steel skin, so that the channel provides the female die as soon as applied to the steel jacket.

The flexible tape may include two upstanding strips of sufficient width to provide the needed support on both sides of the channel between them, but the strips are preferably no wider than is needed to provide the necessary strength to resist the strains induced by creasing the board operated on. In this way the cutting of channels is avoided. The strip of channelled flexible material is readily and economically produced by providing a strippable temporary backing on one adhesive face of pressure sensitive adhesive tape, and applying a pair of spaced strips of suitable material forming a pair of shoulders, preferably hard linen or plastic, lengthwise of the other side, so that the creasing rule may crease a cardboard sheet by pressing it in the channel between the strips.

So long as the temporary backing lies on the back and the strips lie on the front the flexible tape may be handled and shipped safely. When it is desired to use the flexible tape for preparing a makeready, the tape is cut to a proper length, usually at a 45° angle at each end, and the backing removed. The backing is either removed in advance, or removed a little at a time as the bare flexible tape with its spaced cardboard strips is attached by the bared adhesive to the steel jacket to form the finished makeready. The steel jacket preferably has a thin sheet of paper, preferably news print paper, pasted to it in order to facilitate application of the tape. The adhesive tape is preferably transparent so the workman can see the lines on the paper covered steel jacket which indicates crease lines.

It may be noted that the crease lines are preferably marked on the news print sheet carried by the jacket steel by carbon paper, as by placing a blank cardboard on the flat-bed male die, placing a carbon sheet on that, and then operating the press as if to score the cardboard, with the result that the male die scoring rules marks the proper lines for the channels of the female scoring die. The workman lays the bared flexible strip on those lines, ignoring any of the lines the cutting knives may have made through the carbon paper. The bared adhesive seizes the sheet of news on contact and holds the strip in place.

Thus the adhesive tape, carrying the two spaced strips enables the rapid laying out and forming of the makeready, especially if the adhesive tape which carries the strips is transparent.

An object of the invention is to provide a simple and economical method of providing a creasing female die makeready used in making cardboard boxes and the like.

Another object of the invention is to provide a method of providing a makeready without requiring the services of a skilled workman.

Another object of the invention is to obtain the hitherto unobtainable uniform score-width, so much needed.

Another object of the invention is to economize time in preparing a channelled makeready for scoring sheet cardboard of the invention.

Another object of the invention is to provide a makeready requiring no cutting away for the cutting knives.

Another object of the invention is to provide a female makeready without the need of manually cutting a channel element to serve as a female makeready.

Another object of the invention is to provide a readily handled strip having a channel suitable as a female die makeready.

Another object of the invention is to provide a strip of flexible tape for forming a prepared female die having a transparent section enabling the workman to see through the section the line to which it is applied.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 4 shows a cutoff length of the flexible female die strip;

Fig. 5 is a section along the line 5—5 of Fig. 4;

Fig. 6 is a plan view of a cut and creased cardboard blank; and

Fig. 7 is a section on the line 7—7 of Fig. 6 showing the dies in position for forming the blank.

Figure 1:
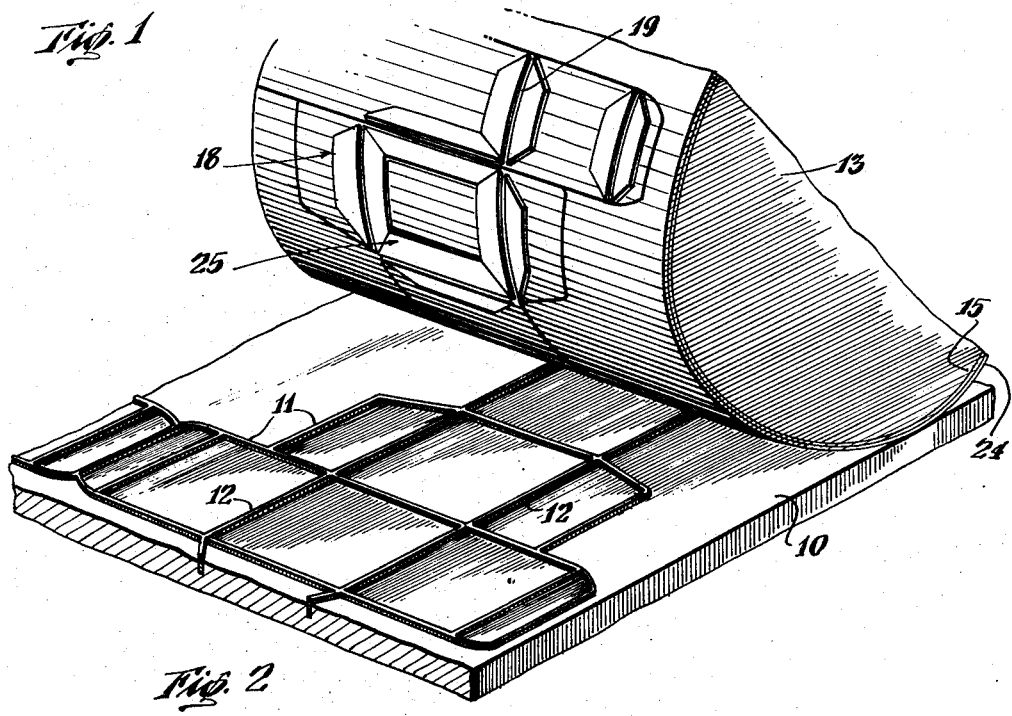
Fig. 1 is a fragmentary view of one form of flat bed male die and its cooperating creasing and cutting roll.
Figure 2:
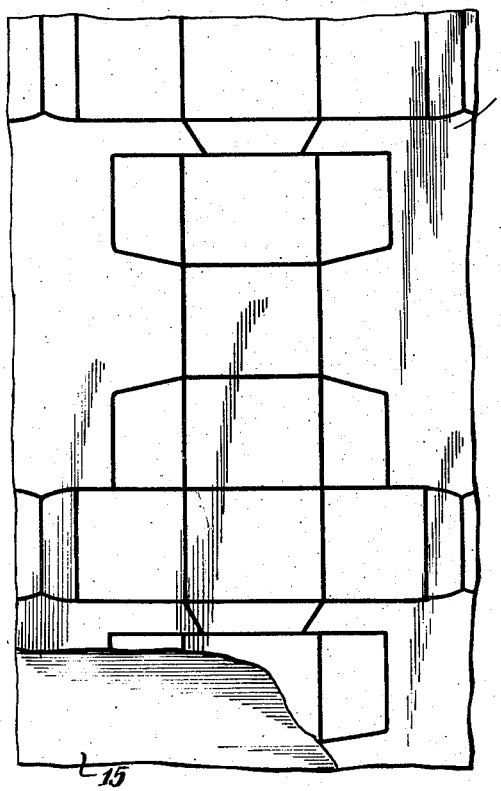
Fig. 2 shows a projection partly broken away of the male dies for cutting and creasing a cardboard blank.
Figure 3:
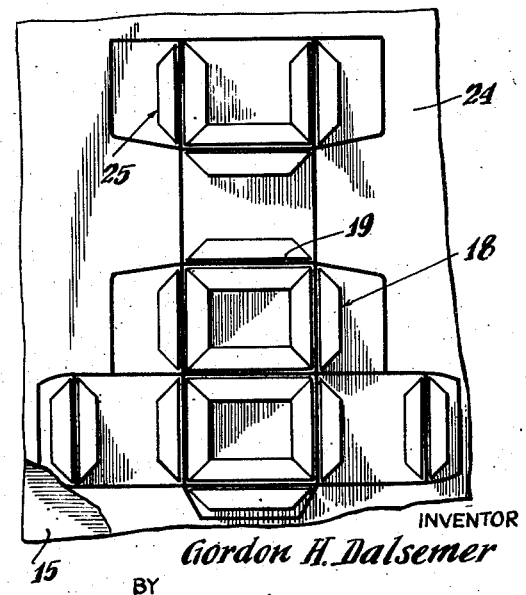
Fig. 3 shows a similar projection of the female creasing dies partly broken away.

Referring again to the drawings illustrating a preferred embodiment of the invention and one way of performing the method, there is shown in Figs. 1 and 7 a flat bed 10 and the cooperating upper cylinder 13 of a flat bed press, between which sheets of cardboard are fed to form box blanks similar to that shown in Fig. 6. The flat bed 10 carries cutting knives 11 and creasing rules 12 commonly called the cutting and creasing dies. The cylinder 13 carries the makeready with channels 19, which will be described hereinafter, as the female die for the scoring rules 12. The cutting knives 11 operating adjacent the cylinder 13 cut out a foldable box blank and the scoring rules 12 cooperate with the channels 19 on the surface of the cylinder 13 to compress the fold lines 17 in the blank 14 (Fig. 6).

According to the present invention, the creasing makeready on the surface of the cylinder 13 may take the form of a channeled flexible strip 18, cut in suitable lengths, if desired, and preferably having a transparent bottom 29 for the channel 19. In the form shown the bottom of the channel 19 may take the form of the central portion of a transparent pressure sensitive tape 20 of the type known as Scotch tape, which adheres by contact. The tape 20 may vary widely, but is shown as adhesively carrying along each edge an upstanding strip 26 of hard suitable material to form shoulders about 3/8 inch wide and nearly 1/32 inch thick, so that the two strips 26 leave between them, the channel 19 about 1/16 inch wide. Other widths and thicknesses will often be preferable for a particular job in hand, and it will be convenient to carry several types of tape in stock.

In the form shown the flexible strip 18 is normally adhesive on its back 22 and is protected against accidental sticking while handling or shipping by an easily strippable backing 23 of any suitable paper, as for example heavy crepe paper.

When the strip 18 is to be applied to the jacket of the cylinder 13, the jacket is usually first covered with paper, preferably a blank white news sheet 24 pasted on it which is often satisfactory at 0.003 inch in thickness. A dummy sheet of board (not shown) is laid on the flat bed 10 and covered with carbon paper, carbon side up, and the cylinder 13 given a rotation so as to mark on the news sheet 24 the lines of the creasing rules 12 and incidentally the lines of the cutting knives 11. The dummy sheet of cardboard is desirable because the distance between the die and the surface of the upper cylinder is too great for the die to engage the carbon paper without the cardboard backing.

The pressman then cuts off a length 25 (Fig. 1) of flexible strip 18, for example, the length of the creasing rule 12, with the ends cut to a suitable angle, usually a 45° angle and applies it to the line just marked on the news print sheet 24 by the creasing rule 12, and after stripping off the protective backing 23, presses the length 25 (Fig. 1) to the line so that the marked line lies in the center of the channel 19, and its adhesive back holds it there. This simple affixing of that length 25 forms the female die for that line.

The workman similarly cuts off other lengths of the flexible strip 18, applies each to the proper line on the news sheet 24, until the female die is complete.

Usually the press is then ready for operation because the 45° angles take care of most fold lines and the narrow strips 26 are so narrow that no cutting away is usually needed although it is easy to cut the ends of the strip 18 at other angles to suit special conditions if occasion arises.

When the female die units are complete, the press is ready for operation by revolving its cylinder and feeding at the proper time cardboard blanks or sheets which come through, to the opposite side, cut by knives 11 to form the outline of the desired blanks and creased by creasing rules 12 which have forced the cardboard blanks into the channels 19, so that blanks are easily folded at the crease lines.

It will be seen that the present invention provides an inexpensive means and method for building up a makeready. The channels therein will be of accurate uniform width and accurately positioned by reason of the transparent bottom. Harder materials may be used for the shoulders of the channels. A substantial saving in time is achieved and relatively unskilled labor may be utilized. The resulting box blanks will have scores of uniform thickness and more accurately positioned without cracks. The boxes will glue straighter and run better on high speed automatic machines, and be more satisfactory because of uniform score widths. The makeready is sturdy in construction and fully capable of withstanding the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described one embodiment of the invention in some detail, what is claimed is:

1. A flexible strip adapted to form a creasing female die including a flexible tape carrying an adhesive backing, a pair of spaced upstanding strips secured to the flexible tape and forming a channel between the strips adapted to cooperate with a creasing rule to form a crease in cardboard, and a strippable backing covering the adhesive.

2. A flexible strip adapted to form a creasing female die including a transparent flexible tape carrying an adhesive backing, a pair of spaced upstanding strips secured to the flexible tape and forming a channel between the strips adapted to cooperate with a creasing rule to form a crease in cardboard, and a strippable backing covering the adhesive.

3. A press cylinder carrying a female creasing die, said die including two spaced shoulder strips, a transparent strip on which the spaced strips are mounted, a paper cover for the cylinder, and an adhesive adhering the transparent strip to the cover.

4. A press cylinder carrying a female creasing die, said die including a plurality of sets of two spaced shoulder strips, said sets cut at 45° angles at their joining ends, a transparent strip on which the spaced strips are mounted, a paper cover for the cylinder, and an adhesive adhering the sets of strips to the cover.

5. A press roller carrying a metal jacket to face a cutting knife, a creasing makeready on the outer surface of the jacket, said creasing makeready including a pair of spaced shoulder strips adapted to cooperate with a creasing rule to crease cardboard and a transparent adhesive-faced strip to which the shoulder strips adhere and which holds them to the jacket.

6. A press roller carrying a metal jacket to face a cutting knife, a creasing makeready on the outer surface of the jacket, said creasing makeready including a set of pairs of spaced shoulder strips adapted to cooperate with a creasing rule to crease cardboard, and a transparent adhesive-faced strip to which each of the pairs of shoulder strips adhere and which holds them to the jacket.

7. A press roller carrying a metal jacket to face a cutting knife, a creasing makeready on the outer surface of the jacket, said creasing makeready including a set of pairs of spaced shoulder strips meeting at a suitable angle and adapted to cooperate with a creasing rule to crease cardboard, and a transparent adhesive-faced strip to which each of the pairs of shoulder strips adhere and which holds them to the jacket.

8. The process of building a makeready female crease die on a surface which includes marking on the surface the center lines of the creases, and applying to said center lines a tape carrying spaced shoulder ridges adapted to cooperate with a creasing rule to crease cardboard compressed between the rule and the channel between the ridges.

9. The process of building a makeready female crease die on a surface to cooperate with creasing ruler on a facing surface which includes pressing the surfaces together with carbon paper between them to mark crease lines for the makeready, and laying on the marked crease lines and securing to said surface a tape carrying spaced shoulder ridges adapted to cooperate with the creasing rule to compress and crease cardboard between them.

10. The process of building a makeready female crease die on a surface to cooperate with creasing ruler on a facing surface which includes bringing the surfaces together with carbon paper between them to mark crease lines for the makeready, and laying on the marked crease lines a transparent adhesive tape carrying spaced shoulder ridges adapted to cooperate with the creasing rule to compress and crease cardboard between them.

11. The process of building a makeready female crease die on a surface to cooperate with a creasing ruler on a facing surface which includes bringing the surfaces together with carbon paper between them and backed with cardboard to mark crease lines for the makeready, and laying on the marked crease lines a transparent adhesive tape carrying spaced shoulder ridges adapted to cooperate with the creasing rule to compress and crease cardboard between them.

12. The process of building a makeready female crease die on a cylinder which includes covering the cylinder jacket with a paper cover, rotating the cylinder to cooperate with facing crease rules with carbon paper between the rules and the cylinder to mark crease lines on the paper, applying to the paper an adhesive tape carrying spaced shoulder ridges so that the marked lines fall in the channels between the ridges and the crease rules fall in the channels as the cylinders rotate.

13. The process of building a makeready female crease die on a cylinder which includes covering the cylinder jacket with a paper cover, rotating the cylinder to cooperate with facing crease rules with carbon paper between the rules and the cylinder to mark crease lines on the paper, applying to the paper a transparent adhesive tape carrying spaced shoulder ridges so that the marked lines are seen in the channels between the ridges and the crease rules will fall in the channels as the cylinders rotate.

14. The process of building a makeready female crease die on a cylinder which includes covering the cylinder jacket with a paper cover, rotating the cylinder to cooperate with facing crease rules with carbon paper backed by a sheet of cardboard between the rules and the cylinder to mark crease lines on the paper, applying to the paper a transparent adhesive tape carrying spaced shoulder ridges so that the marked lines are seen in the channels between the ridges and the crease rules will fall in the channels as the cylinder rotates.

15. The process of building a makeready female crease die on a cylinder which includes covering the cylinder jacket with a paper cover, rotating the cylinder to cooperate with facing crease rules on a flat bed with carbon paper backed by a sheet of cardboard between the bed and the cylinder to mark crease lines on the paper, applying to the paper a transparent adhesive tape carrying spaced shoulder ridges so that the marked lines are seen in the channels between the ridges and the crease rules will fall in the channels as the cylinder rotates with the reciprocating flat bed.

GORDON H. DALSEMER.

REFERENCES CITED

The following references are of record in the file of this patent:

UNITED STATES PATENTS

| Number | Name | Date |
|---|---|---|
| 1,361,564 | Callery | Dec. 7, 1920 |
| 2,174,567 | Dahmen | Oct. 3, 1939 |
| 2,233,207 | Gillam | Feb. 25, 1941 |

OTHER REFERENCES

The Practice of Presswork by Craig R. Spicher, 2nd. Ed., 1929 (published by the author in Chicago).